Patented Oct. 8, 1946

UNITED STATES PATENT OFFICE 2,409,015

METHOD OF MAKING ALKOXY ACETALS

Carl Bordenca, Chicago, and Clifford J. B. Thor, Western Springs, Ill., assignors to The Visking Corporation, Chicago, Ill., a corporation of Virginia No Drawing. Application October 6, 1944, Serial No. 557,549

9 Claims. (Cl. 260—615)

This invention relates to a new and useful method for making alkoxy acetals. More particularly, it relates to a process for making diethyl acetals of alkoxyacetaldehydes, in which the alkoxy group contains a three or four carbon atom grouping.

Diethyl acetal of ethoxyacetaldehyde has been prepared by reacting sodium ethoxide and ethyl chloracetal. Lieben (Annalen, 146, 196) discloses carrying out this reaction in a sealed tube. Leuchs and Geiger (Berichte 39, 2645) discloses carrying out this reaction by heating the reactants in an autoclave at 160° C. Kluger (Monatshefte 26, 881) and Eissler (ibid 27, 1130) discloses carrying out this reaction in a closed tube at 150° C. According to each of the aforementioned disclosures, no product was obtained by heating the reactants at atmospheric pressure.

The art is silent and contains no disclosure of diethyl acetals of alkoxyacetaldehydes in which the alkoxy group contains a three or four carbon atom grouping. When attempts were made to utilize the aforementioned process for producing such acetals, the yield was negligible.

An object of this invention is to provide a new and improved process for producing alkoxy acetals.

Another object of this invention is to provide a process for producing diethyl acetals of alkoxyacetaldehydes in which the alkoxy group contains a three or four carbon atom grouping.

Other and additional objects will appear hereinafter.

The above objects are accomplished, in general, by reacting the appropriate alkali metal alkoxide with diethyl acetal of chloracetaldehyde in the presence of an inorganic iodide and separating the product from the reaction mixture by distillation. The reaction is preferably carried out in the presence of an auxiliary (water-immiscible) solvent. Preferably also, the mixture containing the reactants and iodide is heated under reflux at atmospheric pressure.

The details and manner of practicing the invention will become apparent by reference to the following specific examples, it being understood that these examples are merely illustrative embodiments of the invention and that the invention is not limited thereto. Throughout the examples the proportions are parts by weight:

Example I

To a stirred solution of 164 parts of sodium n-propoxide in 700 parts of n-propyl alcohol was added a solution of 20 parts of sodium iodide in 150 parts of n-propyl alcohol. The mixture was heated under reflux and 300 parts of the diethyl acetal of chloroacetaldehyde was added to the heated mass. The mixture was heated under reflux for a period of 3 hours, and then distilled to remove the excess n-propyl alcohol. The residual mixture was then heated under reflux for 8 hours and then poured into 750 parts of water. The organic layer which formed was separated and, upon being distilled under reduced pressure, yielded a clear, water-white distillate consisting of the diethyl acetal of n-propoxyacetaldehyde.

Example II

To a stirred solution of 164 parts of sodium iso-propoxide in 700 parts of iso-propyl alcohol was added a solution of 20 parts of sodium iodide in 150 parts of iso-propyl alcohol. The mixture was heated under reflux and 250 parts of xylol and 300 parts of the diethyl acetal of chloracetaldehyde were added to the heated mass. The mixture was heated under reflux for a period of 3 hours, and then distilled to remove excess iso-propyl alcohol. The residual mixture was heated under reflux for 10 hours, and then poured into 750 parts of water. The organic layer which formed was separated and, upon being distilled under reduced pressure, yielded a clear water-white distillate consisting of the diethyl acetal of iso-propoxyacetaldehyde.

Example III

To a stirred solution of 192 parts of sodium n-butoxide in 700 parts of n-butyl alcohol was added a solution of 20 parts of sodium iodide in 150 parts of n-butyl alcohol. The mixture was heated under reflux and 300 parts of the diethyl acetal of chloroacetaldehyde was added to the heated mass. The mixture was heated under reflux for 3 hours and then was distilled to remove excess n-butyl alcohol. The residual mixture was heated under reflux for 8 hours and then poured into 750 parts of water. The organic layer which formed was separated and, upon being distilled under reduced pressure, yielded a clear, water-white distillate consisting of the diethyl acetal of n-butoxyacetaldehyde.

The effect on the yield by the use of sodium iodide in the process is shown by the following table:

| Process | Yield |
| --- | --- |
| 1 | 230 parts. |
| 2 | 80 parts. |
| 3 | Negligible. |

1. The process as described in Example I;
2. The process as described in Example I, except that 5 parts of sodium iodide was used;
3. The process as described in Example I, except that no sodium iodide was used.

As shown by the specific examples, sodium iodide is preferred. However, it is to be understood that the invention is not restricted to such specific iodide. In general, any inorganic iodide which is soluble in the reaction mixture, and particularly the alkali metal iodides, can be used.

The quantity or proportion of iodide which can be used is not restricted to those set forth in the examples. As previously mentioned, definite and substantial increase in the yield of the desired product is obtained when a substantial amount of the iodide is incorporated in the reaction mixture. In general, the greater the quantity of iodide the greater the yield. However, it has been found that proportions higher than about 12.5% by weight and based on the alkali metal alkoxide do not materially affect the yield and, therefore, such percentage may constitute the higher limit.

Example II discloses that embodiment of the invention which utilizes an auxiliary solvent. Although xylol is disclosed in Example II as the auxiliary solvent, it is to be understood that the invention is not restricted to the use of such specific solvent. In general, any inert high boiling, substantially water-immiscible, liquid in which the desired alkoxy acetal is soluble can be used. Xylol, decalin, and tetralin are illustrative examples of solvents which have been used with success.

The reactants are normally used in molecular proportions. However, an excess of chloracetal may be used. When such is the case, the excess chloracetal functions as a high boiling solvent.

In the specific examples, the reaction is effected under reflux at atmospheric pressure. Though such procedure is preferred especially in the production of diethyl acetals of alkoxyacetaldehydes in which the alkoxy group contains a three or four carbon atom grouping, the invention can be advantageously utilized when the reaction is effected in a closed vessel or an autoclave.

The invention provides a method of producing new and useful alkoxy acetals which have the following structural formula:

$$R.O.CH_2.CH\begin{matrix}O.CH_2.CH_3\\O.CH_2.CH_3\end{matrix}$$

in which R represents

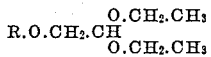

| | n-propyl | iso-propyl | n-butyl |

These acetals are useful as intermediates for the preparation of numerous compounds. They are colorless liquids having a pleasant ethereal odor and are only slightly miscible with water.

The following properties were observed for the diethyl acetals of n-propoxy, iso-propoxy-, and n-butoxy-acetaldehydes, prepared as described above:

|  | Derivative | | |
| --- | --- | --- | --- |
|  | n-Propoxy | iso-Propoxy | n-Butoxy |
| Boiling point at 20 mm. °C | 78 | 67 | 84 |
| Specific gravity D 25/4 | 0.8817 | 0.8944 | 0.8681 |
| Refractive index at 25° C | 1.402 | 1.409 | 1.405 |

It is to be understood that the above data were obtained from single preparations of the above compounds and, while such data will be useful in identifying these compounds, it is to be understood that the invention is not limited to products having the exact constants listed.

Although the invention has been described with particular reference to the production of diethyl acetals of n-propoxy, iso-propoxy and n-butoxy acetaldehydes, the method can be advantageously employed in the production of the lower alkoxy acetals.

Since it is obvious that various changes and modifications may be made in the above description without departing from the nature or spirit thereof, this invention is not restricted thereto except as set forth in the appended claims.

We claim:

1. In the process of preparing alkoxy acetals by the reaction of an alkali metal alkoxide with diethyl acetal of chloracetaldehyde, the improvement which comprises carrying out the reaction in the presence of an inorganic iodide.

2. In the process of preparing alkoxy acetals by the reaction of an alkali metal alkoxide with diethyl acetal of chloracetaldehyde, the improvement which comprises heating a mixture containing the reactants and an inorganic iodide under reflux at atmospheric pressure.

3. In the process of preparing alkoxy acetals by the reaction of an alkali metal alkoxide with diethyl acetal of chloracetaldehyde, the improvement which comprises heating a mixture containing the reactants, an inert high boiling solvent and an inorganic iodide under reflux at atmospheric pressure.

4. In the process of preparing alkoxy acetals by the reaction of an alkali metal alkoxide with diethyl acetal of chloracetaldehyde, the improvement which comprises carrying out the reaction in the presence of sodium iodide.

5. In the process of preparing alkoxy acetals by the reaction of an alkali metal alkoxide with diethyl acetal of chloracetaldehyde, the improvement which comprises heating a mixture containing the reactants and sodium iodide under reflux at atmospheric pressure.

6. In the process of preparing alkoxy acetals by the reaction of an alkali metal alkoxide with diethyl acetal of chloracetaldehyde, the improvement which comprises heating a mixture containing the reactants, an inert high boiling solvent and sodium iodide under reflux at atmospheric pressure.

7. In the process of preparing alkoxy acetals the step which comprises carrying out the reaction of diethyl acetal of chloracetaldehyde and an alkali metal alkoxide in which the alkyl group is selected from the class which consists of n-propyl, iso-propyl and n-butyl groups in the presence of an inorganic iodide which is soluble in the reaction mixture.

8. In the process as set forth in claim 7 wherein the mixture of reactants and the inorganic iodide is heated under reflux at atmospheric pressure.

9. In the process set forth in claim 7 wherein the reaction mixture contains an inert high boiling solvent and said reaction mixture is heated under reflux at atmospheric pressure.

CARL BORDENCA.
CLIFFORD J. B. THOR.